A. W. PUTNAM.
Grain Drill.
No. 63,424.
2 Sheets—Sheet 1.
Patented Apr. 2, 1867.
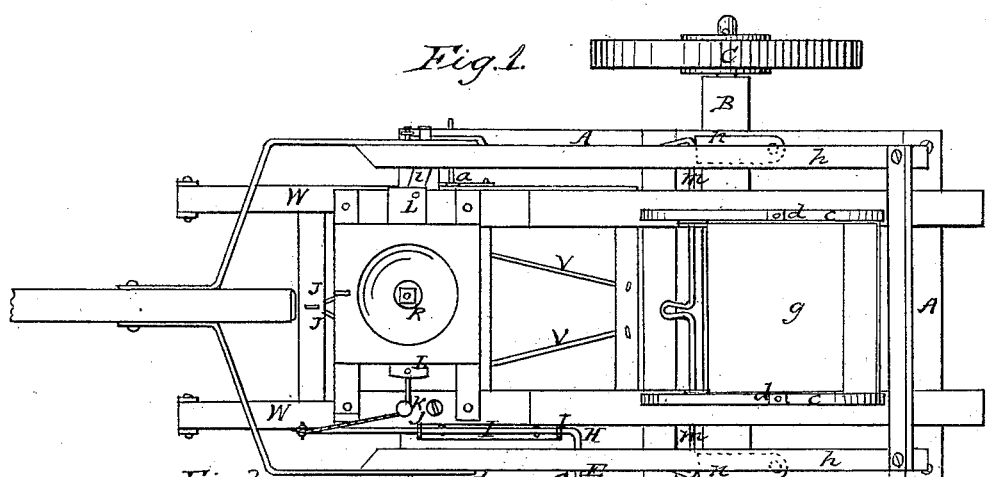
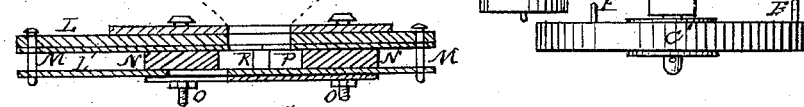
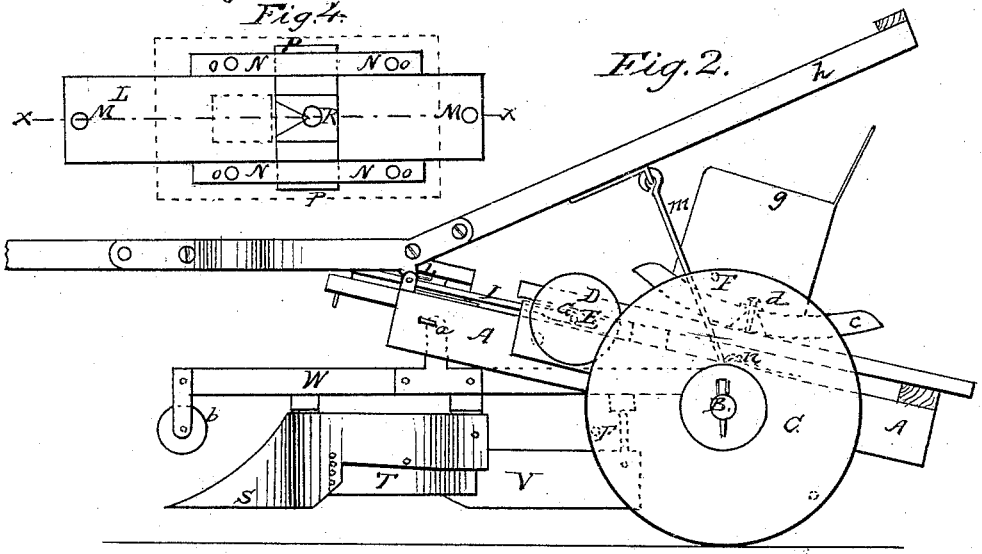
Witnesses:
Geo. H. Strong
Chas. O. Manthy
Inventor:
A. W. Putnam
By his Att'ys
Dewey & Co.

A. W. PUTNAM.
Grain Drill.

2 Sheets—Sheet 2.

No. 63,424.

Patented Apr. 2, 1867.

Witnesses:
Geo. H. Strong
Geo. A. Marshy

Inventor:
A. W. Putnam
By his Attys
Dewey & Co.

United States Patent Office.

ANSEL WALLACE PUTNAM, OF SUISUN, CALIFORNIA.

*Letters Patent No. 63,424, dated April 2, 1867.*

IMPROVEMENT IN COMBINED PLANTER AND CULTIVATOR.

*The Schedule referred to in these Letters Patent and making part of the same.*

TO ALL WHOM IT MAY CONCERN:

Be it known that I, ANSEL WALLACE PUTNAM, of Suisun, Solano county, State of California, have invented a new and useful "Rocking-Chair Planter and Cultivator;" and I do hereby declare the following description and accompanying drawings are sufficient to enable any person skilled in the art or science to which it most nearly appertains to make and use my said invention without further invention or experiment.

The nature of my invention is to provide an improved planter and cultivator so constructed as to plant with great regularity and dispatch. By its use, after the ground is prepared, a furrow for the seed is made, the seed dropped into it and then covered. The "rocking-chair," which gives the machine its name, is attached to the frame loosely, so that it can be tipped back and forward at the will of the driver, and by this means the marker is made to run lightly over the ground or caused to enter it more deeply, as the driver throws his weight forward of the axle or behind it. By means of two arms hinged to the forward part of the frame, that part can be lifted and secured by a catch, so that the marker will not touch the ground, and the mechanism for planting may be thrown out of gear, thus allowing the machine to be transported from place to place.

To more fully explain my invention reference is had to the accompanying drawings, forming a part of this specification, of which—

Figure 1, sheet 1, is a plan view.

Figure 2, sheet 1, is a side elevation with the marker elevated from the ground.

Figures 3 and 4, sheet 1, are views of the mechanism for dropping the seed.

Figure 5:
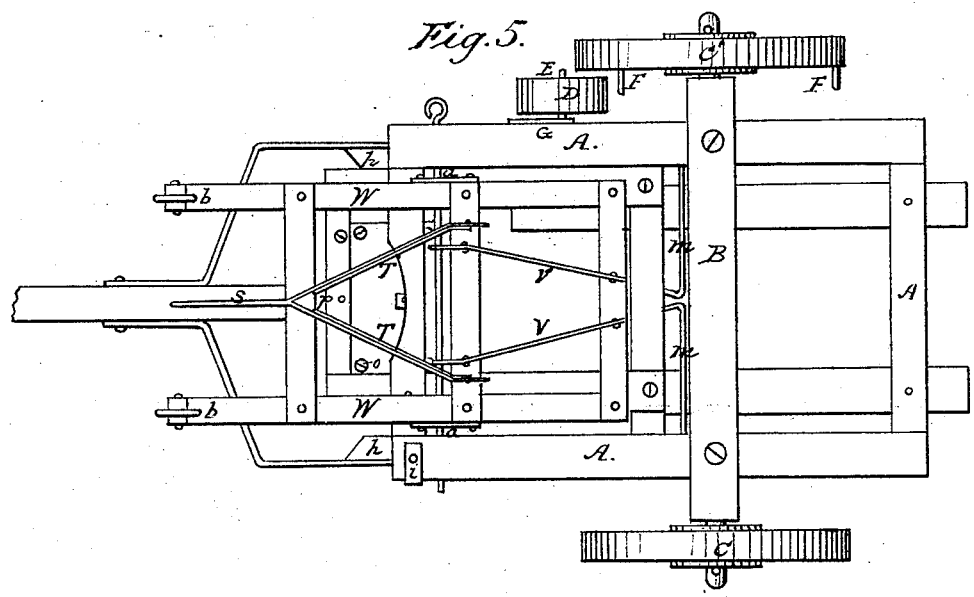

Figure 5, sheet 2, is a bottom view.

Figure 6:
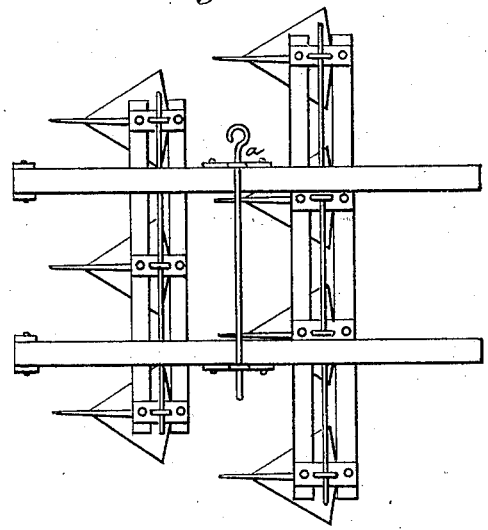

A is the frame of the machine, supported by the axle B and the wheels C C'. D is a wheel turning on the arm E, and operated with its supporting arm by the pins F on the wheel C', the number of pins being determined by the size of the wheel and the length of the spaces between the hills. The arm E moves in a slot in the support G, and is bent at right angles at H, the part I sliding back and forward in the boxes J J. A cord, chain, or other device, is attached to the end of I, and passing around the pin K is fastened to the slide L, which is thus moved back and forward across the bottom of the hopper, as is clearly shown at figs. 3 and 4. A spring, $i$, is attached to the opposite end of the slide L, the elasticity of which returns the slide after the pins on the wheel C' have passed the wheel D. The two plates L and L' are attached together by pins M, and the space between them is regulated by the thickness of the blocks N, as the quantity of the seed needed may vary with the kind. These blocks may be easily removed, and others, thicker or thinner, substituted by removing the bolts O O. A slide, P, is inserted between these blocks N. This slide has a hole, R, in the middle, of sufficient size to admit the seed, and is of the same thickness as the blocks N. This slide is changed for one thicker or thinner at the same time with the blocks N. The plate L has an opening which lets the seed pass from the hopper to the slide P, thus filling the hole R. This is allowed to drop when the slides move back again, as the opening in L' is then brought under the hole R, while the opening in L is closed. The marker S is constructed so as to make a furrow for the seed to drop in. The back part of the marker diverges on each side of the centre, and carries the movable plates T T. These plates serve to throw all the lumps and dry surface earth back from the furrow, thus leaving fresh earth to be used in covering the seed. This work is done by the plates V V, which are somewhat lower than T T, and converge from their front to their rear extremities. These plates bring the earth toward the centre and thus cover the seed evenly. The plates T T may be raised or lowered so as to throw away more or less surface earth, while the plates V V may be raised or lowered, and thus regulate the depth to which the seed shall be covered. The mechanism for furrowing and covering is attached to a supplementary frame, W, which is hinged to the principal frame, as shown at $a$. The rollers $b$ $b$, at the front of the frame, move on the surface of the ground and regulate the depth of the furrow. The rockers $c$ $c$ are attached to the frame by pins, $d$, passing loosely through the centre, so as to allow the chair to rock. A seat, $g$, is supported on these rockers, and by throwing his weight forward the driver is enabled to make the furrows as low as desirable; or, by rocking back, the forward part of the machine may be made to run very light. When it is necessary to lift it entirely, by rocking back and lifting a little upon the arms $h$ $h$, which are rigid with the pole, the bent arm $m$ is brought forward so as to become locked by the catch $n$. A lever may also be attached so as to throw the wheel D out of the reach of the pins on the wheel C', and the machine can then be transported like any other wheeled vehicle. When desired, the mechanism for planting may be removed by simply withdrawing the rod a, and the culivators, which are shown in red at fig. 6, sheet 2, may be attached, so that, after planting, the same machine may be used to cultivate either with a pair of horses or a single one.

Having thus described my invention, what I claim, and desire to secure by Letters Patent, is—

1. The apparatus for furrowing for and covering the seed, consisting of the marker S, the diverging plates T T, and the converging plates V V, combined and arranged substantially as described.

2. The wheel D, and bent arm E, together with the sliding plates L L', and the regulating slide P, for dropping the seed, constructed and operated substantially as described.

3. The rocking-chair attached to the frame, and the hinged arms h h, for the purpose of raising and lowering the frame, substantially as described.

In witness whereof I have hereunto set my hand and seal.

ANSEL WALLACE PUTNAM. [L. S.]

Witnesses:
    GEO. H. STRONG,
    GUS. A. MANEHY.